United States Patent [19]
Matsumoto et al.

[11] Patent Number: 5,585,039
[45] Date of Patent: Dec. 17, 1996

[54] SOLID POLYMER ELECTROLYTE AND METHOD OF MANUFACTURE THEREOF

[75] Inventors: Morihiko Matsumoto, Tokorozawa; Toshihiro Ichino, Hoya; Shiro Nishi, Kodaira, all of Japan

[73] Assignee: Nippon Telegraph and Telephone Corporation, Tokyo, Japan

[21] Appl. No.: 570,192

[22] Filed: Dec. 11, 1995

Related U.S. Application Data

[63] Continuation of Ser. No. 219,820, Mar. 29, 1994, abandoned, which is a continuation of Ser. No. 5,129, Jan. 15, 1993, abandoned.

[30] Foreign Application Priority Data

Jan. 20, 1992 [JP] Japan ..................... 4-027463

[51] Int. Cl.$^6$ ............................. H01B 1/00; H01G 9/025
[52] U.S. Cl. ..................... 252/500; 252/518; 252/62.2; 429/33; 429/46; 429/192; 205/923; 205/928
[58] Field of Search ..................... 252/500, 518, 252/519, 62.2; 429/33, 46, 192; 205/928, 923

[56] References Cited

U.S. PATENT DOCUMENTS

| | | | |
|---|---|---|---|
| 4,174,152 | 11/1979 | Giglia et al. | 252/500 |
| 4,555,414 | 11/1985 | Hoover et al. | 427/43.1 |
| 4,654,279 | 3/1987 | Bauer et al. | 429/192 |
| 4,737,422 | 4/1988 | Knight et al. | 429/192 |
| 5,116,541 | 5/1992 | Motogami et al. | 252/518 |
| 5,122,303 | 6/1992 | Tieke | 252/518 |
| 5,153,820 | 10/1992 | MacFarlane et al. | 361/525 |
| 5,219,681 | 6/1993 | Yamada et al. | 429/192 |

FOREIGN PATENT DOCUMENTS

| | | |
|---|---|---|
| 0318161 | 5/1989 | European Pat. Off. |
| 0332771 | 9/1989 | European Pat. Off. |

OTHER PUBLICATIONS

European Search Report dated Jun. 16, 1993 for Application No. EP 93400135.5.
Abraham et al "Li$^+$-conductive Solid Polymer Electrolytes ..." J. Electrochem. Soc. 137(5) 1657–1658 1990.
Ionic Conductivity of Hybrid Films Composed of Polyacrylonitrile, Ethylene Carbonate, and LiClO$_4$, M. Watanabe et al., Journal of Polymer Science, 21:939–948 (1983).
Synthesis, NMR Characterization, And Electrical Properties of Siloxane–Based Polymer Electrolytes, R. Spindler et al., Macromolecules, 21(3):648–654 (1988).

*Primary Examiner*—Paul Lieberman
*Assistant Examiner*—M. Kopec
*Attorney, Agent, or Firm*—Finnegan, Henderson, Farabow, Garrett & Dunner, L.L.P.

[57] ABSTRACT

The present invention presents a solid polymer electrolyte consisting of a multiphase polymer matrix and an electrolyte solution. The polymer matrix consists of a highly polar polymeric (HPP) phase impregnated with the electrolyte solution to form ion conducting channels, and a less polar polymeric (LPP) phase, constituting the support structure. Further, the invented solid polymer electrolyte may also include a second ion conducting channels, forming a multiphase microstructure in which the electrolyte solution is present around the LPP particles as a fine mesh-like network. The invention also presents two kinds of method for making such a solid polymer electrolyte. The first includes the steps of: making a multiphase polymer matrix; and impregnating the polymer matrix with an electrolyte solution. The second includes the steps of: making a multiphase polymer matrix containing an electrolyte in advance; and impregnating the multiphase polymer matrix containing the electrolyte with a solvent to dissolve the electrolyte or electrolyte solution in the polymer matrix.

10 Claims, 2 Drawing Sheets

SOLID POLYMER ELECTROLYTE AND METHOD OF MANUFACTURE THEREOF

This application is a continuation of application Ser. No. 08/219,820 filed Mar. 29, 1994, now abandoned, which is a continuation of application Ser. No. 08/005,129 filed Jan. 15, 1993, now abandoned.

BACKGROUND OF THE INVENTION

FIELD OF THE INVENTION

This invention relates to a solid polymer electrolyte and a method for manufacturing thereof. Specifically, the invention is related to a low cost solid polymer electrolyte and a method of producing such a solid polymer electrolyte, having excellent ionic conductivity suitable for high energy density batteries, such as lithium batteries, which is easy to manufacture and having superior mechanical properties.

TECHNICAL BACKGROUND OF THE INVENTION

In recent year, there has been an increasing need for small rechargeable batteries for portable electronic instruments, which would be portable and offer high energy density. A representative example is lithium secondary batteries. However, lithium batteries now available in the marketplace are based on organic liquid electrolytes, and there remain many problems, such as leaking of electrolyte liquid and dendrite shorts. There are therefore a strong need to develop solid electrolyte based batteries.

Solid electrolytes of two different types are known: one type is based on inorganic materials and the other type is based on polymeric materials. Because it is cost effective to produce large surface areas with polymeric materials, high capacity batteries having a large surface area can be more readily produced using a polymeric electrolyte material than using an inorganic electrolyte material which must be produced by some vacuum process such as sputtering. It can also be expected that polymer electrolyte materials would lead to lowering of the production cost. Such an expectation is further enhanced because of the special properties of polymers that they can be produced in a variety of forms including a flexible sheet form, thus permitting portable batteries of the required shapes to be produced readily, and enabling customization of portable power driven electronic instruments to be produced economically.

In solid polymer electrolyte materials, much effort has been expended in studying polyether group of materials such as polyethylene oxide. These solid electrolytes are the type which operates by the movement of ions surrounded by the polymer chains, activated by the thermal motion (segment motion) of the polymer chains (R. Spinder and D. F. Shriver, J. Amer, Chem. Soc., 21, 648 (1988)).

However, such solid polymer electrolyte materials are faced with the limitations on the segment movement capability of the polymer chains near room temperatures, and it was difficult to generate high ionic conductivity over $10^{-4}$ S/cm where S denotes an inverse resistivity. Further, to increase the ionic conductivity by increasing the molecular chain motion of the polymer, it is necessary to decrease the molecular weight or soften the polymer, resulting in a large reduction in the mechanical properties of the solid polymer electrolyte. Thus, in spite of examples like lithium batteries, it has not been possible to obtain high capacity batteries, because of the low ionic conductivity of the solid polymer electrolyte at room temperature.

Additionally in recent years, there have been reports of an electrolyte made by impregnating a metallic salt electrolyte solution into polar polymers (polyacrylonitrile) (M. Watanabe et al, J. Polym. Sci. Polym. Phys., 21, 939 (1983)), and an electrolyte made by cross linking a composite, containing polar polymers, electrolyte solution and a light sensitive cross-linking agent by irradiating it with ultraviolet rays (K. M. Abraham and M. Alamgir, J. Electrochem. Soc., 137, 1657 (1990)). Among these samples, there are some which exhibited ionic conductivities in excess of $10^{-3}$ S/cm, but the mechanical properties of the material suffered because the impregnation of electrolyte into polar polymers resulted in softening of the polymer. Also, irradiation of ultraviolet rays is a dangerous and high cost step of manufacturing which needed to be addressed.

SUMMARY OF THE INVENTION

The present invention has an objective of providing a solid polymer electrolyte having sufficient ionic conductivity and superior mechanical properties, which is easy to be manufactured at low cost.

A feature of the solid polymer electrolyte according to the present invention is the containment of an electrolyte solution within a polymer matrix having a multiphase structure. The polymer matrix comprises a highly polar phase and a less polar phase, and the electrolyte solution is contained in the highly polar phase to form ion conductive channels, and the less polar phase forms a supporting structural phase. Further, it is permissible to have the electrolyte solution in the less polar phase as a fine mesh-like network to form a secondary ion conductive channel.

Further, the present invention presents a method of manufacturing a solid polymer electrolyte comprising the steps of: preparing a polymer matrix having a multiphase structure first; followed by impregnating the electrolyte solution into the polymer matrix. Another method involves the steps of: preparing a polymer matrix having a multiphase structure and containing an electrolyte first; then impregnating a solvent into the polymer matrix having the multiphase structure containing the electrolyte.

The polymer matrix having the multiphase structure is made by preparing a dispersion medium containing polymer particles of a highly polar nature and polymer particles of a less polar nature, and removing a dispersion medium from the mixture subsequently. Additionally, the polymer matrix having the multiphase structure is made by dissolving the polymer matrix produced above in a solvent or by dissolving a mixture of the highly polar polymer and the less polar polymer in the solvent, and removing the solvent subsequently.

The solid polymer electrolyte of the present invention is produced by immersing the polymer matrix having the multiphase structure in an electrolyte solution, and thereby impregnating the matrix with the electrolyte solution.

The polymer matrix having the multiphase structure, and containing the electrolyte material is produced during the manufacturing step of the polymer matrix having the multiphase structure by dissolving the electrolyte in a dispersion medium or in a solvent.

The solid polymer electrolyte of the present invention is produced by immersing the polymer matrix having the multiphase structure and containing the electrolyte material in a solvent which dissolves the electrolyte material, and thereby impregnating the polymer matrix with the solvent to generate the electrolyte solution.

In the solid polymer electrolyte of the present invention, the high ionic conductivity is produced as a result of having ion conductive channels responsible for ionic conduction being formed either by the electrolyte impregnated in the highly polar phase or being present in the less polar phase as a fine mesh-like network. Further, the solid polymer electrolyte of the present invention is able to maintain high mechanical strength because the solid electrolyte has a supporting phase comprising a less polar polymer, thus preventing softening by the electrolyte solution.

Further, according to the method of making a solid polymer electrolyte of the present invention, dispersion of the polymer particles, dissolution of the polymer, solvent removal and impregnation of the liquid can be carried out at low cost to produce superior performance properties.

PREFERRED EMBODIMENTS OF THE INVENTION

The solid polymer electrolyte of the present invention has a dual phase-separation microstructure comprising a less polar phase which constitutes the supporting structure, and a highly polar phase which constitutes the ion conductive channel. The solid polymer electrolyte can be classified into two types according to the microstructural difference of the less polar phase produced by the difference in their manufacturing method. Specifically, the one type of solid polymer electrolyte is a mixture type dual phase microstructure comprising a less polar phase (support phase) formed by agglomerating the less polar particles, and the ion conductive channel phase made by impregnating the highly polar phase formed by agglomerating the highly polar particles with electrolyte solution, and in which the less polar particles retain the particle shape. The other type of solid polymer electrolyte is constituted by a amorphous type dual phase microstructure made by dissolving less polar polymer of non-particulate feed materials or particles in a solvent to make a less polar polymer solution, and dissolving highly polar polymer of non-particulate feed materials or particles in a solvent to make a highly polar polymer solution, mixing the two polymer solutions, and then removing the solvent to produce an amorphous dual phase solid polymer electrolyte. The solid polymer electrolyte of this type can also be made by dissolving polymer matrixes, comprising aggregates of highly and less polar polymer particles, and then removing the solvent to produce an amorphous dual phase solid polymer matrix.

Figure 1:
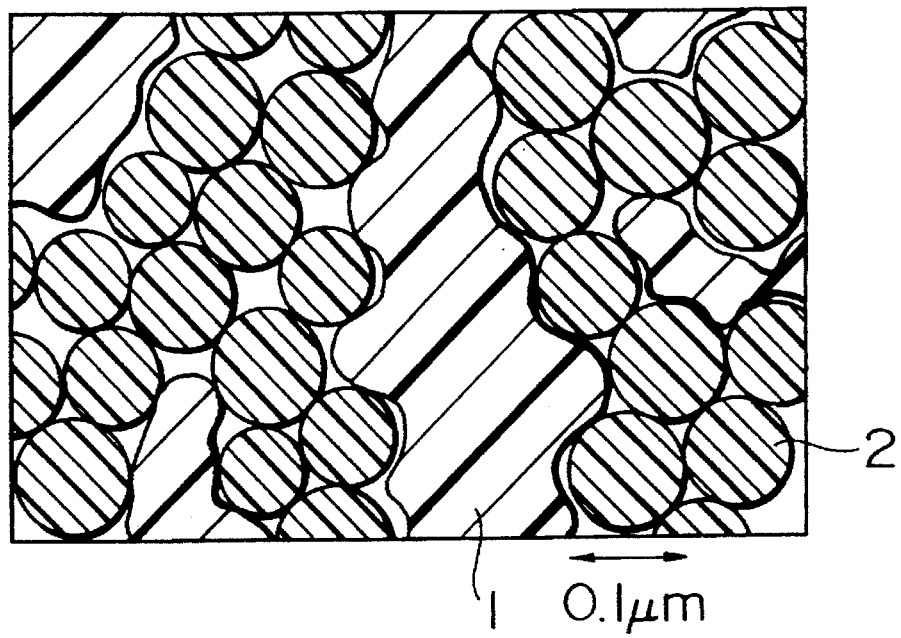
FIG. 1 is a schematic illustration of the cross sectional structure of a solid polymer electrolyte made by a first method.
Figure 2:
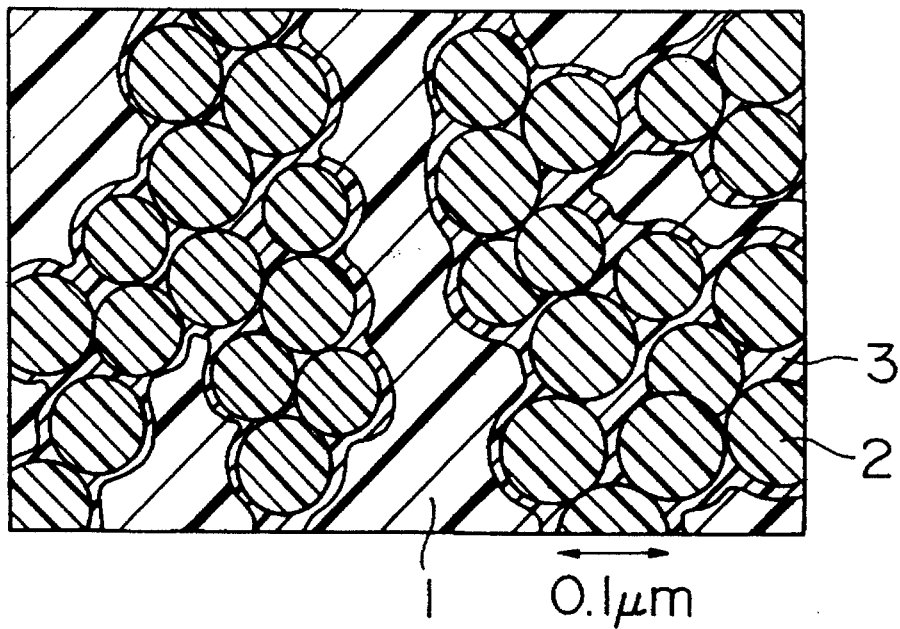
FIG. 2 is a schematic illustration of the cross sectional structure of a solid polymer electrolyte made by a second method.

FIG. 1 shows an example of the morphology of the solid polymer electrolyte in which the particles retain their appearance. The less polar polymer (hereinbelow shortened to LPP) particles comprise poly(styrene-butadiene) latex (termed SBR) particles while the highly polar polymer (hereinbelow shortened to HPP) particles comprise poly(acrylonitrile-butadiene) latex (termed NBR) particles. FIG. 1 is a schematic illustration of the microstructure of the solid polymer electrolyte observed by slicing a thin sample therefrom and examining the sample with a transmission electron microscope (TEM), and an energy dispersive X-ray microanalysis (EDX). In this figure, the reference numeral 1 indicates the ion conductive channel made by impregnating the NBR particles with an electrolyte, and it is seen that the channels do not retain the particle appearance. Further, it is seen that the ion conductive channels 1 are surrounded by a supporting phase 2 comprising particle agglomeration which retain the particle appearance. FIG. 2 shows another example of a solid polymer electrolyte having the dual phase-separation type of microstructure. The microstructure comprises, as in FIG. 1, ion conductive channels 1 and the support phase 2, and further includes a second ion conductive channels 3 constituted by an electrolyte solution disposed around the SBR particles.

In this case, the latex particles are obtained by dispersing the polymer particles in a dispersing medium (which becomes a latex) containing a stabilizer, and removing the dispersing medium later, and are characterized by the presence of the stabilizer on the particle surfaces.

Figure 3:
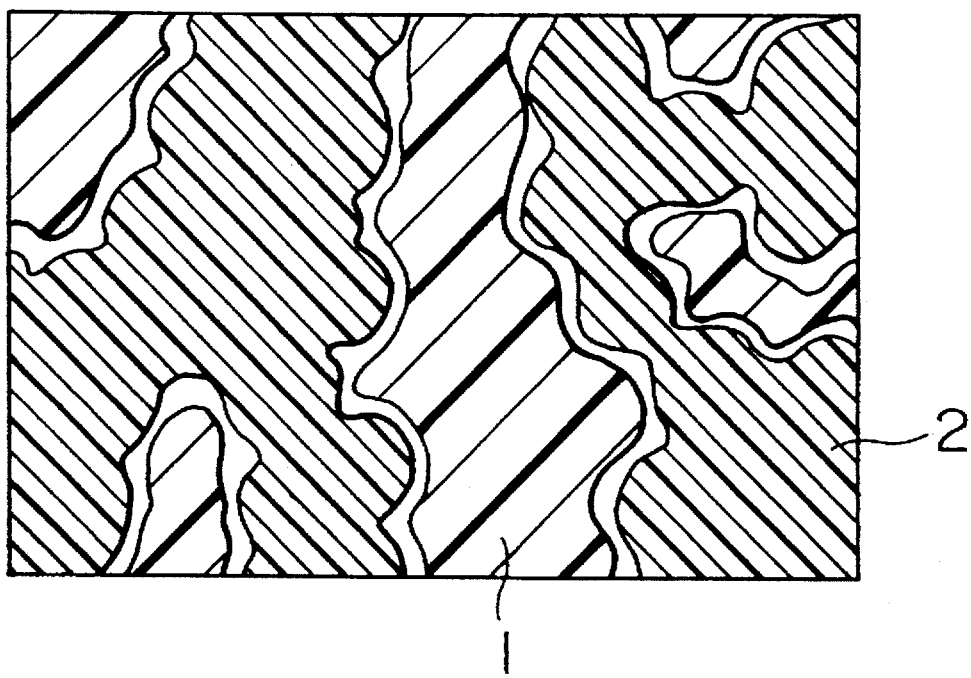
FIG. 3 is a schematic illustration of the cross sectional structure of a solid polymer electrolyte made by one of manufacturing methods 3 to 6.

FIG. 3 shows an example of a amorphous type of solid polymer electrolyte, and both phases comprising the ion conducive channels 1 and the support phase 2 are amorphous and do not retain the particle shape appearance.

In the solid polymer electrolytes shown in these examples, the mechanical properties are maintained by the support phase 2 made of the LPP phase, and the ionic conductivity is generated by the ion conductive channels comprising either the electrolyte solution impregnated in the HPP phase and/or by the electrolyte solution forming the second ion conductive channel, disposed in the support phase as a fine mesh-like network. The invented solid polymer electrolyte thus provides a significant improvement in the value of ionic conductivity over that of the conventional solid polymer electrolytes.

Particularly, as shown in the example of FIG. 1, it is possible to obtain flexible and yet mechanically strong solid polymer electrolyte by incorporating a rubber-like material such as polybutadiene in parts of the HPP and LPP phases. Furthermore, by including polyacrylonitrile in the HPP phase, it becomes possible to impregnate the HPP with a large amount of highly polar electrolyte solution, thereby presenting a solid polymer electrolyte having excellent mechanical properties and superior ionic conductivity.

Regarding the HPP materials for forming the HPP phase constituting the ion conductive channels in the solid polymer electrolyte of the present invention, there is no particular restriction so long as the material is a highly polar polymer which permits impregnation with an electrolyte solution. For example, the substances listed in the following can be used singly or in combination:

Polyacrylonitrile, polyvinylidene fluoride, polyethylene oxide, polypropylene oxide, polyvinyl chloride, polymethylmethacrylate, polymethylacrylate, polymethacrylic acid (and their metallic salts), polyacrylic acid (and their metallic salts), polyvinylalcohol, polyvinylidene chloride, polyethylenimine, polymethacrylonitrile, polyvinylacetate, polyvinylpyrrolidone, including their derivatives.

Also, the copolymers containing such HPP components are capable of being impregnated with a large amount of electrolyte solutions, and are useful in preparing the HPP materials. Some examples are copolymers of: polyacrylonitrile/polybutadiene, polyacrylonitrile/polystyrene, polyacrylonitrile/polybutadiene/polystyrene, polyacrylonitrile/polyisoprene. In particular, polyacrylonitrile/polybutadiene, and polyacrylonitrile/polyisoprene copolymers are especially desirable because they possess flexibility and rubber-like elasticity, and exhibit good affinity to the electrodes. The amount of the HPP component, the polyacrylonitrile material in the above examples, should be over 10% by weight.

On the other hand, the materials suitable for use as a LPP component in the solid polymer electrolyte of the present invention are those which are hardly affected the electrolyte solution which is highly polar, in other words polymers of a less polar nature. For example, hydrocarbon group polymers and their copolymers are suitable. Specifically, the following substances are applicable:

polystyrene, polypropylene, polyisobutene, polyethylene, polybutadiene, polyisoprene, polychloroprene, poly(α-methylstyrene), polybutylmethacrylate, polybutylacrylate, poly(2-ethylhexylacrylate, polydibutylphthalate, polyvinylbutylether, polyvinyl butyral, polyvinyl formal, and their derivatives and copolymers containing the above listed constituents.

Among these, particularly those polymers containing conjugate diene bonding, such as polybutadiene, polyisoprene and polychloroprene, are desirable because of their flexibility and rubber-like elasticity property, and good affinity to the electrodes.

The electrolyte which constitutes the ion conductive channels in the solid polymer electrolyte of the present invention is chosen depending on the applications of the solid polymer electrolyte, and is not particularly restricted. For example, when the electrolyte is to be used for lithium batteries, lithium salts such as $LiClO_4$, $LiAlCl_4$, $LiBF_4$, $LiPF_6$, $LiAsF_6$, $LiNbF_6$, LiSCN, LiCl, $Li(CF_3SO_3)$, $Li(C_6H_5SO_3)$ can be used singly or in combination. The solvent for forming the electrolyte solution is not particularly restricted so long as the solvent is capable of dissolving the electrolyte to be used. Similarly for use in lithium batteries, suitable solvents are for example, propylene carbonate, ethylene carbonate, γ-butyl lactone, dimethyl carbonate, dimethyl sulfoxide, acetonitrile, sulforan, dimethylformamide, dimethylacetoamide, 1,2-dimethoxyethane, 1,2-diethoxyethane, tetrahydrofuran, 2-methyltetrahydrofuran, dioxolan, methylacetate, and the like aprotic polar solvent, and their mixtures. The concentration of the electrolyte solution is preferably in a range of 0.01 to 5 mol/Kg in molal concentration.

The polymeric components constituting the solid polymer electrolyte of the present invention may contain polar organic materials. The polar organic materials provide the function of dispersing the polymer particles by means of their emulsifying properties when they are dispersed in a dispersing medium. The most well known example is a carboxyl modification which introduces carboxyl group in the polymer chains. The polar organic material is directly incorporated in the polymer chains or in the molecular chains constituting the polymer particles by covalent bonding, and for example, the following substances are applicable:

acrylic acids and their metallic salts, methacrylic acids and their metallic salts, ethacrylic acids and their metallic salts, iraconic acids and their metallic salts, styrenesulfonic acids and their metallic salts, ethylenesulfonic acids and their metallic salts, unsaturated fatty acids and their metallic salts, vinylacetic acid, and acrylonitrile.

These polar organic constituents are incorporated into the polymer particles by covalent bonding either in the form of copolymerization or graft copolymerization, or by directly reacting with the functional group of the primary components of the polymer particles. It is also possible to introduce a polar organic constituent by treating the primary component of the polymer particles by treating with sulfuric acid and the like.

Further, the polymeric constituents which comprise the solid polymer electrolyte of the present invention may contain a cross-linking material. The cross-linking material improves the mechanical properties of the polymer matrixes by providing an inter cross-linking function and forming a cross-linked structure between: polymer molecules; polymer particles; chains of the polymer molecules; or within the chains of the polymer molecules. The cross-linking material is introduced by covalent bonding of more than two types of polar organic constituents in the molecular chains of the polymeric component or polymer particles. In practice, more than two types of polymers or polymer particles containing polar organic segment are heated, thereby generating inter- and intra-cross-linking of the particles, and forming cross-linked regions. Representative examples of such cross-linking reaction are esterification reaction, amidation, ring-opening reaction of the epoxy group. To perform intra-molecular or inter-molecular cross-linking, it is necessary to provide more than two types of amido group, hydroxy group, carboxyl group, epoxy group to the polymer chains. Such polymers are termed self cross-linking polymers. For example, it is possible to obtain a self cross-linking polymer by copolymerization of monomers of the primary component of the polymer particles with more than two types of cross-linking monomers. Such cross-linking monomers are not particular restricted, but the following substances are suitable: acrylamide, diacetone acrylamide, hydroxyethylacrylate, hydroxyethyl methacrylate, hydroxypropylacrylate, acrylic acids, methacrylic acids, iraconic acids, glycidylacrylate, glycidylmethacrylate, arylglycidylether and the like.

The polymeric phases comprising the solid polymer electrolyte of the present invention may include stabilizers. The emulsifiers are not particularly restricted so long as they are capable of stabilizing the dispersion of the polymer particles. Emulsifiers are particularly desirable, and the following are some examples:

fatty acid metallic salts, alkylbenzenesulfonic acid metallic salts, alkylsulfuric acid metallic salts, dioctylsulfosuccinic acid metallic salts, polyoxyethylene nonylphenyl ether, polyoxyethylene stearic acid ester, polyoxyethylenesorbitan monolaurylic acid ester, polyoxyethylene-polyoxypropylene block copolymer, polyether modified silicone oil, and their mixtures.

Further, for stabilizers, solubilizing polymers capable of dissolving the dispersion medium can be used singly or in combination with above mentioned emulsifiers. The choice of such solubilizing polymers varies depending on the dispersion media, but for example, when water is employed as a dispersion medium, hydroxyethylcellulose, polyvinylalcohol, polyacrylic acid metallic salts, methylcellulose, polyoxyethlene, polyvinylpyrrolidone can be used singly or in combination.

Next, the method of making the solid polymer electrolyte of the present invention will be explained. The method comprises the steps of: making a polymer matrix consisting essentially of highly polar polymers (HPP) and less polar polymers (LPP) and impregnating the matrix with an electrolyte solution. The following three methods are available for the matrix making process.

Method A: A polymer matrix is made by dispersing HPP particles and LPP particles in a dispersion medium, and removing the medium therefrom to make the polymer matrix.

Method B: A polymer matrix is made by making a polymer dispersion solution by dispersing HPP particles and LPP particles in a dispersion medium and removing the medium therefrom to make a first matrix; and dissolving the first matrix in a solvent again, and removing the solvent therefrom to form a second matrix.

Method C: A polymer matrix is made by dissolving HPPs and LPPs in a solvent to make a polymeric mixture solution, and removing the solvent therefrom to made the matrix.

Further, there are two type of methods are available for the step of impregnating a polymer matrix with an electrolyte solution.

Method a: A polymer matrix is made first followed by impregnating the matrix with an electrolyte solution.

Method b: In the step of forming a polymer matrix, an electrolyte is first dissolved either in a polymer solution or a polymer particle dispersion, removing the solvent or the dispersion medium from the solution or dispersion to make a polymer matrix containing the electrolyte, and then impregnate the matrix with a solvent to dissolve the electrolyte. In this case, the solvent used in the last step of this method may include another electrolyte. That is to say, not only a solvent but also an electrolyte solution can be used in the last step of this method.

Therefore, there are six different ways a solid polymer electrolyte can be made regardless of which of the matrix making methods A, B or C is chosen to make the polymer matrix, because each matrix making method A, B or C can be combined with one of the two impregnation methods a or b. Each such methods will be explained in detail in the following.

Manufacturing Method 1 (combination of A and a)

This method comprises the steps of dispersing HPP and LPP particles in a dispersing medium; removing the dispersing medium from the dispersion thus making a matrix; and impregnating the matrix with an electrolyte solution.

The method of making the dispersion does not depend on whether the HPP or LPP is involved. In practice, it is preferable to emulsion polymerize monomers in a water-based dispersing medium. The emulsion polymerization method for making a polymer dispersion is generally known, and is carried out as outlined below.

When the primary monomers are introduced by dripping into a water-based reaction medium containing an emulsifier in excess of the critical micelle concentration, a part of the primary monomers is taken into the interior of the emulsifier micelies. By adding a water soluble polymerization initiator (such as persulfate metallic salts) to the reaction medium and heating, polymerization initiator radicals are generated, and when such radicals are taken into the micelle filled with the monomers, the primary monomers are polymerized and grow to form polymeric particles. While the growth process is taking place by means of the polymerization reaction, the primary monomers are continued to be supplied from the emulsified monomer drops to the micelies, i.e. the reaction sites. After suitable period of reaction time, the reaction medium is cooled, thereby stopping the polymerization reaction and obtaining polymeric particles.

The diameter of the particles used in the invented process can be adjusted by varying the polymerization reaction time to obtain suitable size of particles between 0.01 and 500 μm.

The mixed reaction medium may also contain various monomers of polar organic materials and crosss-linking polymer materials. These monomers also undergo copolymerization in the micelle reaction sites, and copolymerize with the primary component. Such polar organic materials have low mutual solubility with the primary component, they become preferentially distributed on the outside of the polymer particles. There is no particular restriction in the ratio of the primary component to the polar organic materials, but it is preferable that the primary component is over 20% by weight of the total completed solid polymer electrolyte.

It is permissible to add stabilizers such as emulsifiers and polymers to the polymer particle dispersion for solubilizing the particle dispersion medium.

A polymer dispersion suitable for the above reaction can be made in a polar solvent such as alcohol by means of dispersion polymerization (Y. Almog et al, British Polymer Journal, 14, 131, (1982)). The polymer dispersion may also be made by spreading and dispersing the polymer solution in a dispersing medium for agglomeration, and stabilizing the particles by adding a stabilizer.

The LPP and HPP particles thus made as described above are mixed in a suitable ratio, and blended mechanically. Next, the mixed dispersion is cast on a substrate base, and the dispersing medium is removed by heating, thus obtaining a film-like polymer matrix containing agglomerated polymer particles. The heating may be performed in any suitable manner, including a reduced pressure. However, to produce a uniform polymer matrix, it is preferable to heat the matrix to temperatures in excess of the glass transition temperatures for the polymer particles involved.

There is no particular restriction in the mixing ratio of HPP to LPP particles. However, to achieve both high ionic conductivity and mechanical properties, it is preferable that each be present in excess of 10% by weight of the total weight of the solid polymer electrolyte, consisting of the matrix and the solid electrolyte.

When using self cross-linking type polymer particles for the polymer particles, cross-linking reaction will occur within the particles and between the particles during the heating step to remove the dispersing medium. The introduction of cross-linking will further increase the mechanical strength of the solid polymer electrolyte. To achieve such cross-linking, it is necessary that the temperature be in excess of 100° C.

Further, the matrix may be press compacted to form the polymer matrix into a desired shape.

It should be noted that if the dispersing medium is detrimental to the operating environment of the solid electrolyte, e.g. batteries, it is preferable that the dispersing medium be removed completely by heating the matrix to over the boiling point of the medium by heating or by a combination of heating and reduced pressure.

The polymer matrixes thus produced are immersed in an electrolyte solution to impregnate the matrixes. The amount of impregnated electrolyte solution can be adjusted by controlling the immersion time. It is preferable that the solvent be over 10% by weight of the total weight of the solid polymer electrolyte, consisting of the matrix and the electrolyte.

Manufacturing Method 2 (combination of A and b)

This method comprises the steps of: dispersing HPP and LPP particles in a dispersing medium containing an electrolyte; removing the dispersing medium thus making a matrix containing the electrolyte; and impregnating the matrix containing the electrolyte with a solvent for dissolving the electrolyte.

The method of making a dispersion of polymer particles containing an electrolyte is to dissolve the electrolyte in either or both of the HPP and LPP dispersions, and mixing the dispersions; or mixing the HPP and LPP dispersions first and then dissolving the electrolyte in the mixed dispersion. The method of making the polymer dispersion is the same as in Method 1.

Polymer matrixes are produced from the polymer dispersion by removing the dispersing medium in the same way as described in Method 1.

Next, the polymer matrix containing the electrolyte is immersed in a solvent for dissolving the electrolyte, thereby impregnating the matrix with the solvent and dissociating the electrolyte to make the solid polymer electrolyte. The amount of impregnated solvent is regulated by controlling the immersion time. It is preferable that the weight of the solvent be over 10% by weight of the total weight of the solid polymer electrolyte.

Manufacturing Method 3 (combination of B and a)

This manufacturing method comprises the steps of: dispersing HPP and LPP particles in a dispersing medium; removing the dispersing medium from the mixed dispersion thus making a first polymer matrix; dissolving the polymer matrix in a solvent; removing the solvent to make a second polymer matrix; and impregnating the second matrix with an electrolyte solution.

The methods for making the mixed polymer dispersions and making the matrixes therefrom are the same as in Method 1.

Next, the matrix produced in the above step is dissolved in a lesser or intermediate polar solvent, and removing the solvent to make a second polymer matrix. The solvent for dissolving the matrix in this case can be any such solvents as: nitroethane, tetrachloroethane, chlorobenzene, chloroform, benzene, toluene, cyclohexane, dimethylformamide, acetonitrile, dimethylacetoamide, dioxane, acetone, tetrahydrofuran, 2-methyltetrahydrofuran, 1,2-dimethoxyethane, methylacetate, ethylacetate, butylacetate, propanol, isopropanol.

The method for removing the solvent is preferably by heating, under normal or a reduced pressure. It is preferable to heat the matrix to temperatures in excess of the glass transition temperatures for the polymer constituents involved. If the solvent used to dissolve the matrix is detrimental to the operating environment of the solid electrolyte, e.g. batteries, it is preferable that the solvent be removed completely by heating the matrix to over the boiling point of the solvent by heating or by a combination of heating and reduced pressure.

The second matrix thus produced is immersed in an electrolyte solution to impregnate the matrix therewith. The amount of electrolyte solution to be impregnated is preferably over 10% by weight of the total weight of the solid polymer electrolyte.

Manufacturing Method 4 (combination of B and b)

This method comprises the steps of: dispersing HPP and LPP particles in a dispersing medium containing an electrolyte; removing the dispersing medium thus making a first polymer matrix containing the electrolyte; dissolving the first polymer matrix containing the electrolyte in a solvent; removing the solvent and making a second matrix containing the electrolyte; and impregnating the second matrix with the solvent and dissociating the electrolyte to make the solid polymer electrolyte.

The method of making dispersions containing an electrolyte and the method of making matrixes containing the electrolyte from the dispersions are the same as in Method 2.

Next, the matrix containing the electrolyte is dissolved in a lesser or intermediate polar solvent, the solvent is removed and making a second matrix that contains the electrolyte. This manufacturing method is the same as in Method 3.

The second matrix containing the electrolyte is immersed in a solvent to impregnate the second matrix with the solvent and dissolve the electrolyte therein to some degree. It is preferable that the amount of solvent to be impregnated is over 10% by weight of the total weight of the solid polymer electrolyte.

Manufacturing Method 5 (combination of C and a)

This method comprises the steps of: dissolving the HPP and LPP materials in a solvent; removing the solvent thus making a matrix; and impregnating the matrix with an electrolyte solution.

First, HPP and LPP materials are dissolved in a solvent in a suitable weight ratio. Suitable solvents are: nitroethane, tetrachloroethane, chlorobenzene, chloroform, benzene, toluene, cyclohexane, dimethylformamide, acetonitrile, dimethylacetoamide, dioxane, acetone, tetrahydrofuran, 2-methyltetrahydrofuran, 1,2-dimethoxyethane, methylacetate, ethylacetate, butylacetate, propanol, isopropanol.

The mixing ratio of the HPP and LPP materials is not particularly restricted. However, to achieve both high ionic conductivity and mechanical properties, it is preferable that each be present in excess of 10% by weight of the total weight of the solid polymer electrolyte.

The method for removing the solvent is preferably by heating, under normal or a reduced pressure. It is preferable to heat the matrix to temperatures in excess of the glass transition temperatures for the polymer materials involved. If the solvent used to dissolve the matrix is detrimental to the operating environment of the solid electrolyte, e.g. batteries, it is preferable that the solvent be removed completely by heating the matrix to over the boiling point of the solvent by heating or by a combination of heating and reduced pressure.

When using self cross-linking type polymer materials, cross-linking reaction will occur within the polymer chains and between the polymer chains during the heating step to remove the solvent. The introduction of cross-linking will further increase the mechanical strength of the solid polymer electrolyte. To achieve such cross-linking, it is necessary that the temperature in excess of 100° C. be used.

Further, the matrix may be press compacted to form the polymer matrix into a desired shape.

The polymer matrix thus produced is impregnated with an electrolyte solution, and it is preferable that the amount of electrolyte solution be over 10% by weight of the total solid polymer electrolyte.

Manufacturing Method 6 (combination of C and b)

This method comprises the steps of: dissolving a HPP material, a LPP material and an electrolyte in a solvent; removing the solvent and making a matrix; and impresonating the matrix with a solvent to dissolve the electrolyte in the polymer matrix.

First, HPP and LPP materials and electrolyte are dissolved in a solvent in a suitable weight ratio. The method and the solvent are the same as in Method 5.

Next, the solvent is removed thereby making a matrix, in accordance with the Method 5.

The matrix containing the electrolyte is then immersed in a solvent for impregnating the matrix with the solvent and dissolving the electrolyte therefrom. It is preferable that the amount of solvent impregnated is over 10% by weight of the weight of the solid polymer. electrolyte.

It was also found that the microstructures of the solid polymer electrolyte differ depending on which of the above method is chosen.

The solid polymer electrolyte produced by Method 1 exhibits a mixed dual phase microstructure, shown in FIG. 1, comprising an amorphous HPP phase (ion conducting channels) impregnated with an electrolyte solution and a LPP phase (support phase) showing the particle boundaries.

The solid polymer electrolyte produced by Method 2 exhibits a mixed type dual phase microstructure, shown in FIG. 2, comprising an amorphous HPP phase (primary ion conducting channels) and a LPP phase (support phase) showing the particle boundaries having a secondary ion conducting channels around the LPP particles.

The solid polymer electrolytes produced by one of Methods 3 to 6 exhibits an amorphous type dual phase microstructure, shown in FIG. 3, comprising an amorphous HPP phase (ion conducting channels) impregnated with an electrolyte solution, and an amorphous LPP phase (support phase).

The microstructures of Methods 1 and 2 are produced because the method is based on producing the polymer matrix by removing the dispersion medium from a particulate dispersion containing polymeric aggregates, particulate shapes of the polymer particles are retained. Further in Method 2, the electrolyte dissolved in the dispersion medium, containing the polymer particles, is left behind in the matrix not only in the HPP phase but also around the LPP particles (SBR latex particles) upon removal of the dispersion medium, and in the subsequent solvent impregnation step, the electrolyte around the LPP particles dissolves, thus forming the secondary ion conductive channel constituted by the electrolyte. The presence of the secondary ionic conductive channels is confirmed from TEM analyses.

Also, the matrixes made from an amorphous liquid phase made by dissolving HPP materials or particles and LPP materials, the microstructures are amorphous as shown in FIG. 3.

EXAMPLES

The applications of the present invention are illustrated in the Examples which follow; however, the present invention is in no way limited to the embodiments described.

Certain parameters of Experiments are summarized in the tables, such as butadiene contents in LPP, LPP particles, HPP, and HPP particles; weight ratio of particles of LPP/ HPP; weight ratio of the materials of LPP/HPP; the type of electrolyte and solvent in the electrolyte solution; impregnated amount of the electrolyte solution; and ionic conductivity of the manufactured solid polymer electrolyte. Table 1 summarizes the solid polymer electrolytes made by method 1, and the results from the methods 2 to 6 are respectively reported in Tables 2 to 6 consecutively.

In the tables, the item of "Modifier" refers to the presence or absence of the polar organic material and cross-linking material, and, of the various polar organic materials, A indicates the presence of a carboxyl-based modifier material, and B indicates the presence of a cross-linking material.

In the column for the electrolyte solvent, γ-BL indicates γ-butylolactone, EC is ethylene carbonate, PC is propylene carbonate, DME is 1,2-dimethoxyethane, 2-MeTHF is 2-methyltetrahydrofuran.

The average particle size was determined from dynamic light scattering measurements.

Experiments 1 to 17

A carboxyl-modified poly(stryene) butadiene) copolymer latex (Nipol LX424 made by Nippon Zeon) was mixed with a carboxyl-modified poly(acrylonitrile-butadyene) copolymer latex (Nipol 1571) in the weight ratio of the solids as reported in Table 1. The mixed latex was cast on a glass Petri dish, dried for three hours at normal pressure and room temperature, and was heated further in a vacuum (<0.01 torr) for 24 hours at 105° C. to obtain a polymer matrix of rubber-like film. The polymer matrix film was then immersed in 1 mol/L electrolyte solutions having the compositions shown in Table 1. The solid polymer electrolyte film of the present invention thus produced retained rubber-like state, and exhibited suitable mechanical properties.

In all the following experiments, the concentration of the electrolyte in the electrolyte solution is the same as in these series of experiments.

Experiments 18 to 20

A carboxyl-modified poly(styene butadiene) copolymer latex (Nipol LX424 made by Nippon Zeon) was mixed with a of poly(acrylonitrile-butadiene) copolymer latex (Nipol 1551) in the weight ratio of the solids as reported in Table 1. The drying conditions for making the polymer matrix of latex film were the same as in Experiments 1–17. The electrolyte used for impregnation were as reported in Table 1. The obtained solid polymer electrolyte retained the rubber-like nature and exhibited suitable mechanical properties.

Experiments 21 to 23

A poly(stryene butadiene) copolymer latex (Nipol LX110 made by Nippon Zeon) was mixed with a latex of carboxyl-modified poly(acrylonitrile-butadiene) copolymer latex (Nipol 1571) in the weight ratio of the solids as reported in Table 1. The drying conditions for making the polymer matrix film were the same as in Experiments 1–17. The electrolyte used for impregnation were as reported in Table 1. The obtained solid polymer electrolyte retained the rubber-like nature and exhibited suitable mechanical properties.

Experiments 24 to 26

A poly(stryene butadiene) copolymer latex (Nipol LX110 made by Nippon Zeon) was mixed with a poly(acrylonitrile-butadiene) copolymer latex (Nipol 1551) in the weight ratio of the solids as reported in Table 1. The drying conditions for making the polymer matrix film were the same as in Experiments 1–17. The electrolyte used for impregnation were as reported in Table 1. The obtained solid polymer electrolyte retained the rubber-like nature and exhibited suitable mechanical properties.

Experiments 27 to 29

A poly(stryene butadiene) copolymer latex (Nipol 2570X5 made by Nippon Zeon), having the self cross-linking material, was mixed with a carboxyl-modified poly-(acrylonitrile-butadiene) copolymer latex (Nipol 1571) in the weight ratio of the solids as reported in Table 1. The drying conditions for making the polymer matrix film were the same as in Experiments 1–17. The electrolyte used for impregnation were as reported in Table 1. The obtained solid polymer electrolyte retained the rubber-like nature and exhibited suitable mechanical properties.

Experiments 30 to 45

A carboxyl-modified poly(stryene butadiene) copolymer latex (Nipol LX424 made by Nippon Zeon) was mixed with a carboxyl-modified poly(acrylonitrile-butadiene) copolymer latex (Nipol 1571) in the weight ratio of the solids as reported in Table 2. In the mixed latex, an electrolyte indicated in the Table 2 was dissolved at a concentration of 0.5 mol per unit solids content of the mixed latex. The mixed latex was cast on a glass Petri dish, dried for three hours at normal pressure and room temperature, and was heated further in a vacuum (<0.01 torr) for 24 hours at 105° C. to obtain a polymer matrix of rubber-like film. The polymer matrix was then immersed in a solvent identified in the Table 2 for each experiment. The solid polymer electrolyte film of the present invention thus produced retained rubber-like state, and exhibited suitable mechanical properties.

Experiments 46–48

A carboxyl-modified poly(stryene butadiene) copolymer latex (Nipol LX424 made by Nippon Zeon) was mixed with a of poly(acrylonitrile-butadiene) copolymer latex (Nipol 1551) in the weight ratio of the solids as reported in Table 2. In the mixed latex, an electrolyte indicated in Table 2 was dissolved at a concentration of 0.5 mol per unit solids content of the mixed latex. The drying conditions for producing the polymer matrix film of the present invention were the same as in Experiments 30–45. The polymer matrix was then immersed in a solvent identified in Table 2 for each experiment. The solid polymer electrolyte film of the present invention thus produced retained rubber-like state, and exhibited suitable mechanical properties.

Experiments 49 to 51

A poly(stryene butadiene) copolymer latex (Nipol LX110 made by Nippon Zeon) was mixed with a carboxyl-modified poly(acrylonitrile-butadiene) copolymer latex (Nipol 1571) in the weight ratio of the solids as reported in Table 2. In the mixed latex, an electrolyte indicated in Table 2 was dissolved at a concentration of 0.5 mol per unit solids content of the mixed latex. The conditions for making the polymer matrix were the same as reported in Experiments 30–45. The impregnation solvents were as identified in Table 2 for each experiment. The solid polymer electrolyte film of the present invention thus produced retained rubber-like state, and exhibited suitable mechanical properties.

Experiments 52 to 54

A poly(stryene butadiene) copolymer latex (Nipol LX110 made by Nippon Zeon) was mixed with a poly(acrylonitrile-butadiene) copolymer latex (Nipol 1551) in the weight ratio of the solids as reported in Table 2. In the mixed latex, an electrolyte indicated in Table 2 was dissolved at a concentration of 0.5 mol per unit solids content of the mixed latex. The conditions for making the polymer matrix were the same as reported in Experiments 30–45. The impregnation solvents were as identified in Table 2 for each experiment. The solid polymer electrolyte film of the present invention thus produced retained rubber-like state, and exhibited suitable mechanical properties.

Experiments 55 to 57

A poly(stryene butadiene) copolymer latex (Nipol 2570X5 made by Nippon Zeon), having the self cross-linking material, was mixed with a carboxyl-modified poly-(acrylonitrile-butadiene) copolymer latex (Nipol 1571) in the weight ratio of the solids as reported in Table 2. In the mixed latex, an electrolyte indicated in Table 2 was dissolved at a concentration of 0.5 mol per unit solids content of the mixed latex. The drying conditions for making the polymer matrix film were the same as in Experiments 30–45. The impregnation solvents are as reported in Table 2. The obtained solid polymer electrolyte retained the rubber-like nature and exhibited suitable mechanical properties.

Experiments 58 to 74

A carboxyl-modified poly(stryene butadiene) copolymer latex (Nipol LX424 made by Nippon Zeon) was mixed with a carboxyl-modified poly(acrylonitrile-butadiene) copolymer latex (Nipol 1571) in the weight ratio of the solids as reported in Table 3. The mixed latex was cast on a glass Petri dish, dried for three hours at normal pressure and room temperature, and was heated further in a vacuum (<0.01 torr) for 24 hours at 105° C. to obtain a polymer matrix of rubber-like film. Next, this film was dissolved in tetrahydrofuran to make a polymer solution. The solvent in the solution was removed by the same technique as the drying step described above to obtain a polymer matrix film. This film was impregnate by immersing the film to obtain a solid polymer electrolyte film of the present invention. The solid polymer electrolyte film thus produced retained rubber-like state, and exhibited suitable mechanical properties.

Experiments 75 to 77

A carboxyl-modified poly(stryene butadiene) copolymer latex (Nipol LX424 made by Nippon Zeon) was mixed with a poly(acrylonitrile-butadiene) copolymer latex (Nipol 1551) in the weight ratio of the solids as reported in Table 3. The subsequent steps were identical to those for the Experiments 58–74. The electrolyte solutions are as reported in Table 3. The obtained solid polymer electrolyte retained the rubber-like nature and exhibited suitable mechanical properties.

Experiments 78 to 80

A poly(stryene butadiene) copolymer latex (Nipol LX110 made by Nippon Zeon) was mixed with a carboxyl-modified poly(acrylonitrile-butadiene) copolymer latex (Nipol 1551) in the weight ratio of the solids as reported in Table 3. The subsequent steps were identical to those for the Experiments 58–74. The electrolyte solutions are as reported in Table 3. The obtained solid polymer electrolyte retained the rubber-like nature and exhibited suitable mechanical properties.

Experiments 81 to 83

A poly(stryene butadiene) copolymer latex (Nipol LX110 made by Nippon Zeon) was mixed with a poly(acrylonitrile-butadiene) copolymer latex (Nipol 1551) in the weight ratio of the solids as reported in Table 3. The subsequent steps are as reported in Experiments 58–74. The electrolyte solutions are as reported in Table 3. The obtained solid polymer electrolyte retained the rubber-like nature and exhibited suitable mechanical properties.

Experiments 84 to 86

A poly(stryene butadiene) copolymer latex (Nipol 2570X5 made by Nippon Zeon), having the self cross-linking material, was mixed with a carboxyl-modified poly(acrylonitrile-butadiene) copolymer latex (Nipol 1571) in the weight ratio of the solids as reported in Table 3. The subsequent steps were identical to those for the Experiments 58–74. The electrolyte solutions are as reported in Table 3. The obtained solid polymer electrolyte retained the rubber-like nature and exhibited suitable mechanical properties.

Experiments 87 to 102

A carboxyl-modified poly(stryene butadiene) copolymer latex (Nipol LX424 made by Nippon Zeon) was mixed with a carboxyl-modified poly(acrylonitrile-butadiene) copolymer latex (Nipol 1571) in the weight ratio of the solids as reported in Table 4. In the mixed latex, an electrolyte indicated in Table 4 was dissolved at a concentration of 0.5 mol per unit solids content of the mixed latex. The mixed latex was cast on a glass Petri dish, dried for three hours at normal pressure and room temperature, and was heated further in a vacuum (<0.01 torr) for 24 hours at 105° C. to obtain a polymer matrix of rubber-like film. Next, this film was dissolved in tetrahydrofuran to make a polymer solution. The solvent in the solution was removed by the same technique as the drying step described above to obtain a polymer matrix film. This film was impregnate by immersing the film to obtain a solid polymer electrolyte film of the present invention. The solid polymer electrolyte film thus produced retained rubber-like state, and exhibited suitable mechanical properties.

Experiments 103 to 105

A carboxyl-modified poly(stryene butadiene) copolymer latex (Nipol LX424 made by Nippon Zeon) was mixed with a poly(acrylonitrile-butadiene) copolymer latex (Nipol 1551) in the weight ratio of the solids as reported in Table 4. In the mixed latex, an electrolyte indicated in Table 4 was dissolved at a concentration of 0.5 mol per unit solids content of the mixed latex. The subsequent steps are as reported in Experiments 87–102. The electrolyte solutions are as reported in Table 4. The obtained solid polymer electrolyte retained the rubber-like nature and exhibited suitable mechanical properties.

Experiments 106 to 108

A carboxyl-modified poly(stryene butadiene) copolymer latex (Nipol LX110 made by Nippon Zeon) was mixed with a carboxyl-modified poly(acrylonitrile-butadiene) copolymer latex (Nipol 1571) in the weight ratio of the solids as reported in Table 4. In the mixed latex, an electrolyte indicated in Table 4 was dissolved at a concentration of 0.5 mol per unit solids content of the mixed latex. The subsequent steps are as reported in Experiments 87–102. The electrolyte solutions are as reported in Table 4. The obtained solid polymer electrolyte retained the rubber-like nature and exhibited suitable mechanical properties.

Experiments 109 to 111

A poly(stryene butadiene) copolymer latex (Nipol LX110 made by Nippon Zeon) was mixed with a poly(acrylonitrile-butadiene) copolymer latex (Nipol 1551) in the weight ratio of the solids as reported in Table 4. In the mixed latex, an electrolyte indicated in the table was dissolved at a concentration of 0.5 mol per unit solids content of the mixed latex. The subsequent steps are as reported in Experiments 87–102. The electrolyte solutions are as reported in Table 4. The obtained solid polymer electrolyte retained the rubber-like nature and exhibited suitable mechanical properties.

Experiments 112–114

A poly(stryene butadiene) copolymer latex (Nipol 2570X5 made by Nippon Zeon), having the self cross-linking material, was mixed with a carboxyl-modified poly(acrylonitrile-butadiene) copolymer latex (Nipol 1571) in the weight ratio of the solids as reported in Table 4. In the mixed latex was dissolved an electrolyte indicated in Table 4 at a concentration of 0.5 mol per unit solids content of the mixed latex. The subsequent steps are as reported in Experiments 87–102. The electrolyte solutions are as reported in Table 4. The obtained solid polymer electrolyte retained the rubber-like nature and exhibited suitable mechanical properties.

Experiments 115 to 119

Poly(styene-butadiene) copolymer feed material (Nipol NS-210 made by Nippon Zeon) was mixed with poly(acrylonitrile-butadiene) copolymer feed material (Acrylonitrile-butadiene copolymer 530, made by Scientific Polymer Co) in the weight ratio as reported in Table 5. The solid mixture was dissolved in tetrahydrofuran to make a polymer solution. The polymer solution was cast on a glass Petri dish, dried for three hours at normal pressure and room temperature to obtain a polymer matrix of rubber-like film, and was heated further in a vacuum (<0.01 torr) for 24 hours at 105° C. to obtain a polymer matrix of rubber-like film. The film was impregnate by immersing the film in a 1 mol/L electrolyte solution to obtain a solid polymer electrolyte film of the present invention. The solid polymer electrolyte film thus produced retained rubber-like state, and exhibited suitable mechanical properties.

The electrolyte concentration in the following Experiments is the same as in the above Experiments.

Experiments 120 to 123

Poly(styene-butadiene) copolymer feed material (Nipol NS-210 made by Nippon Zeon) was mixed with poly(acrylonitrile-butadiene) copolymer feed material (Ultrapure NBR FN-4001 made by Nippon Zeon) in the weight ratio as reported in Table 5. The mixture was dissolved in tetrahydrofuran to make a polymer solution. The subsequent steps were the same as reported in Experiments 115–119. The solid polymer electrolyte film thus produced retained rubber-like state, and exhibited suitable mechanical properties.

Experiment 124

Poly(styene-butadiene) copolymer feed material (Nipol NS-210 made by Nippon Zeon) was mixed with carboxyl-modified poly(acrylonitrile-butadiene) copolymer feed material (Nipol 1072) in the weight ratio as reported in Table 5. The mixture was dissolved in tetrahydrofuran to make a polymer solution. The subsequent steps were the same as reported in Experiments 115–119. The solid polymer electrolyte film thus produced retained rubber-like state, and exhibited suitable mechanical properties.

Experiment 125

Poly(styene-butadiene) copolymer feed material (Nipol 1009 made by Nippon Zeon), having the self cross-linking component, was mixed with poly(acrylonitrile-butadiene) copolymer feed material (Ultrapure NBR FN-4001 made by Nippon Zeon) in the weight ratio as reported in Table 5. The solid mixture was dissolved in tetrahydrofuran to make a polymer solution. The subsequent steps are the same as reported in Experiments 115–119. The solid polymer electrolyte film thus produced retained rubber-like state, and exhibited suitable mechanical properties.

Experiments 126 to 130

Poly(styene-butadiene) copolymer feed material (Nipol NS-210 made by Nippon Zeon) was mixed with poly(acrylonitrile-butadiene) copolymer feed material (Acrylonitrile-butadiene copolymer 530, made by Scientific Polymer Co) in the weight ratio as reported in Table 6. The solid mixture was dissolved in tetrahydrofuran to make a polymer solution. In the mixed polymer solution was dissolved an electrolyte indicated in Table 6 at a concentration of 0.5 mol/Kg of unit polymer weight to make a polymer/electrolyte solution. The polymer/electrolyte solution was cast on a glass Petri dish, dried for three hours at normal pressure and room temperature to obtain a polymer matrix of rubber-like film, and was heated further in a vacuum (<0.01 tort) for 24 hours at 105° C. to obtain a polymer matrix of rubber-like film. The film was impregnated by immersing the film in a 1 mol/L electrolyte solution to obtain a solid polymer electrolyte film of the present invention. The solid polymer electrolyte film thus produced retained rubber-like state, and exhibited suitable mechanical properties.

Example 131–134

Poly(styene-butadiene) copolymers (Nipol NS-210 made by Nippon Zeon), having the self cross-linking component, was mimed with poly(acrylonitrile-butadiene) copolymer component (Ultrapure NBR FN-4001 made by Nippon Zeon) in the weight ratio as reported in Table 6. In the polymer solution was dissolved an electrolyte indicated in Table 6 at a concentration of 0.5 mol/Kg of unit polymer weight to make a polymer/electrolyte solution. The subsequent steps are the same as reported in Examples 126–130. The solid polymer electrolyte film thus produced retained rubber-like state, and exhibited suitable mechanical properties.

Example 135

Poly(styene-butadiene) copolymer feed material (Nipol NS-210 made by Nippon Zeon) was mixed with carboxyl-modified poly(acrylonitrile-butadiene) copolymer feed material (Nipol 1072) in the weight ratio as reported in Table 6. The solid mixture was dissolved in tetrahydrofuran to make a polymer solution. In the mixed-polymer solution was dissolved an electrolyte indicated in Table 6 at a concentration of 0.5 mol/Kg of unit polymer weight to make a polymer/electrolyte solution. The subsequent steps are the same as reported in Examples 126–130. The solid polymer electrolyte film thus produced retained rubber-like state, and exhibited suitable mechanical properties.

Example 136

Poly(styene-butadiene) copolymer feed material (Nipol 1009 made by Nippon Zeon), having the self cross-linking material, was mixed with poly(acrylonitrile-butadiene) copolymer feed material (Ultrapure NBR FN-4001 made by Nippon Zeon) in the weight ratio as reported in Table 6. The solid mixture was dissolved in tetrahydrofuran to make a polymer solution. In the polymer solution was dissolved an electrolyte indicated in Table 6 at a concentration of 0.5 mol/Kg of unit polymer weight to make a polymer/electrolyte solution. The subsequent steps are the same as reported in Experiments 126–130. The solid polymer electrolyte film thus produced retained rubber-like state, and exhibited suitable mechanical properties.

TABLE 1

| Experiment No. | LPP particle | | | HPP particle | | | LPP/ HPP weight ratio | Electrolyte solution | | Impregration content (wt %) | Ionic conductivity (S/cm) |
| | Particle size (μm) | Butadiene (wt %) | Modifier | Particle Size (μm) | Butadiene (wt %) | Modifier | | Electrolyte | Solvent | | |
| --- | --- | --- | --- | --- | --- | --- | --- | --- | --- | --- | --- |
| 1 | 0.15 | 50.0 | A | 0.14 | 60.00 | A | 30/70 | $LiPF_6$ | γ-BL | 58.80 | 1.2 E-3 |
| 2 | 0.15 | 50.00 | A | 0.14 | 60.00 | A | 30/70 | $LiBF_4$ | γ-BL | 57.00 | 1.0 E-3 |
| 3 | 0.15 | 50.00 | A | 0.14 | 60.00 | A | 30/70 | $LiClO_4$ | γ-BL | 59.60 | 1.4 E-3 |
| 4 | 0.15 | 50.00 | A | 0.14 | 60.00 | A | 30/70 | $LiClO_4$ | γ-BL/DME | 65.00 | 2.8 E-3 |
| 5 | 0.15 | 50.00 | A | 0.14 | 60.00 | A | 30/70 | $LiClO_4$ | PC | 46.00 | 3.7 E-4 |
| 6 | 0.15 | 50.00 | A | 0.14 | 60.00 | A | 30/70 | $LiClO_4$ | PC/EC | 45/00 | 4.0 E-4 |
| 7 | 0.15 | 50.00 | A | 0.14 | 60.00 | A | 30/70 | $LiAsF_6$ | PC/EC | 43.00 | 3.2 E-4 |
| 8 | 0.15 | 50.00 | A | 0.14 | 60.00 | A | 30/70 | $LiAsF_6$ | EC/2Me-THF | 63.00 | 2.3 E-3 |
| 9 | 0.15 | 50.00 | A | 0.14 | 60.00 | A | 50/50 | $LiClO_4$ | γ-BL | 48.60 | 8.1 E-4 |
| 10 | 0.15 | 50.00 | A | 0.14 | 60.00 | A | 50/50 | $LiPF_6$ | γ-BL | 47.80 | 8.6 E-4 |
| 11 | 0.15 | 50.00 | A | 0.14 | 60.00 | A | 50/50 | $LiBF_4$ | γ-BL | 48.00 | 5.6 E-4 |
| 12 | 0.15 | 50.00 | A | 0.14 | 60.00 | A | 50/50 | $LiCF_3SO_3$ | γ-BL | 47.10 | 7.00 E-4 |
| 13 | 0.15 | 50.00 | A | 0.14 | 60.00 | A | 50/50 | $LiClO_4$ | γ-BL/DME | 60.50 | 2.2 E-3 |
| 14 | 0.15 | 50.00 | A | 0.14 | 60.00 | A | 50/50 | $LiClO_4$ | PC/DME | 62.70 | 2.7 E-3 |

TABLE 1-continued

| | LPP particle | | | HPP particle | | | LPP/ | Electrolyte solution | | Impregration content (wt %) | Ionic conductivity (S/cm) |
|---|---|---|---|---|---|---|---|---|---|---|---|
| Experiment No. | Particle size (μm) | Butadiene (wt %) | Modifier | Particle Size (μm) | Butadiene (wt %) | Modifier | HPP weight ratio | Electrolyte | Solvent | | |
| 15 | 0.15 | 50.00 | A | 0.14 | 60.00 | A | 50/50 | $LiAsF_6$ | EC/2Me-THF | 58.00 | 2.3 E-3 |
| 16 | 0.15 | 50.00 | A | 0.14 | 60.00 | A | 70/30 | $LiClO_4$ | γ-BL/DME | 50.70 | 1.3 E-3 |
| 17 | 0.15 | 50.00 | A | 0.14 | 60.00 | A | 70/30 | $LiAsF_6$ | EC/2Me-THF | 49.00 | 1.0 E-3 |
| 18 | 0.15 | 50.00 | A | 0.14 | 60.00 | | 30/70 | $LiClO_4$ | γ-BL | 56.00 | 1.0 E-3 |
| 19 | 0.15 | 50.00 | A | 0.19 | 60.00 | | 30/70 | $LiAsF_6$ | EC/2Me-THF | 59.60 | 2.2 E-3 |
| 20 | 0.15 | 50.00 | A | 0.19 | 60.00 | | 50/50 | $LiClO_4$ | γ-BL/DME | 55.60 | 1.9 E-3 |
| 21 | 0.05 | 70.00 | | 0.14 | 60.00 | A | 30/70 | $LiClO_4$ | γ-BL | 55.00 | 1.2 E-3 |
| 22 | 0.05 | 70.00 | | 0.14 | 60.00 | A | 30/70 | $LiAsF_6$ | EC/2Me-THF | 61.00 | 2.1 E-3 |
| 23 | 0.05 | 70.00 | | 0.14 | 60.00 | A | 50/50 | $LiClO_4$ | γ-BL/DME | 58.00 | 1.3 E-3 |
| 24 | 0.05 | 70.00 | | 0.19 | 60.00 | | 30/70 | $LiClO_4$ | γ-BL | 57.30 | 9.6 E-4 |
| 25 | 0.05 | 70.00 | | 0.19 | 60.00 | | 30/70 | $LiAsF_6$ | EC/2Me-THF | 61.80 | 2.1 E-3 |
| 26 | 0.05 | 70.00 | | 0.19 | 60.00 | | 50/50 | $LiClO_4$ | γ-BL/DME | 58.00 | 1.3 E-3 |
| 27 | 0.10 | 50.00 | B | 0.14 | 60.00 | A | 30/70 | $LiClO_4$ | γ-BL | 55.00 | 1.0 E-3 |
| 28 | 0.10 | 50.00 | B | 0.14 | 60.00 | A | 30/70 | $LiAsF_6$ | EC/2Me-THF | 59.30 | 1.0 E-3 |
| 29 | 0.10 | 50.00 | B | 0.14 | 60.00 | A | 50/50 | $LiClO_4$ | γ-BL/DME | 60.10 | 9.8 E-4 |

LPP: less polar polymer
HPP: highly polar polymer

TABLE 2

| | LPP particle | | | HPP particle | | | LPP/ | Electrolyte solution | | Impregration content (wt %) | Ionic conductivity (S/cm) |
|---|---|---|---|---|---|---|---|---|---|---|---|
| Experiment No. | Particle size (μm) | Butadiene (wt %) | Modifier | Particle Size (μm) | Butadiene (wt %) | Modifier | HPP weight ratio | Electrolyte | Solvent | | |
| 30 | 0.15 | 50.0 | A | 0.14 | 60.00 | A | 30/70 | $LiPF_6$ | γ-BL | 58.0 | 1.8 E-3 |
| 31 | 0.15 | 50.00 | A | 0.14 | 60.00 | A | 30/70 | $LiBF_4$ | γ-BL | 57.00 | 9.9 E-4 |
| 32 | 0.15 | 50.00 | A | 0.14 | 60.00 | A | 30/70 | $LiCF_3SO_4$ | γ-BL | 55.40 | 8.8 E-4 |
| 33 | 0.15 | 50.00 | A | 0.14 | 60.00 | A | 30/70 | $LiClO_4$ | γ-BL/DME | 60/90 | 1.8 E-3 |
| 34 | 0.15 | 50.00 | A | 0.14 | 60.00 | A | 30/70 | $LiClO_4$ | PC | 45.00 | 5.0 E-4 |
| 35 | 0.15 | 50.00 | A | 0.14 | 60.00 | A | 30/70 | $LiClO_4$ | PC/DME | 61.00 | 1.9 E-3 |
| 36 | 0.15 | 50.00 | A | 0.14 | 60.00 | A | 30/70 | $LiAsF_6$ | PC/EC | 45.60 | 5.2 E-4 |
| 37 | 0.15 | 50.00 | A | 0.14 | 60.00 | A | 30/70 | $LiAsF_6$ | EC/2Me-THF | 62.00 | 1.8 E-3 |
| 38 | 0.15 | 50.00 | A | 0.14 | 60.00 | A | 50/50 | $LiClO_4$ | γ-BL | 50.60 | 9.8 E-4 |
| 39 | 0.15 | 50.00 | A | 0.14 | 60.00 | A | 50/50 | LiBF | γ-BL | 50/90 | 1.2 E-3 |
| 40 | 0.15 | 50.00 | A | 0.14 | 60.00 | A | 50/50 | $LiCF_3SO_3$ | γ-BL | 49.80 | 1.0 E-3 |
| 41 | 0.15 | 50.00 | A | 0.14 | 60.00 | A | 50/50 | $LiClO_4$ | γ-BL/DME | 58.30 | 1.2 E-3 |
| 42 | 0.15 | 50.00 | A | 0.14 | 60.00 | A | 50/50 | $LiClO_4$ | PC/DME | 60.30 | 1.0 E-3 |
| 43 | 0.15 | 50.00 | A | 0.14 | 60.00 | A | 50/50 | $LiAsF_6$ | EC/2Me-THF | 61.00 | 1.9 E-3 |
| 44 | 0.15 | 50.00 | A | 0.14 | 60.00 | A | 70/30 | $LiClO_4$ | γ-BL/DME | 51.00 | 8.9 E-4 |
| 45 | 0.15 | 50.00 | A | 0.14 | 60.00 | A | 70/30 | $LiAsF_6$ | EC/2Me-THF | 48.90 | 1.1 E-3 |
| 46 | 0.15 | 50.00 | A | 0.14 | 60.00 | A | 30/70 | $LiClO_4$ | γ-BL | 51.90 | 1.2 E-3 |
| 47 | 0.15 | 50.00 | A | 0.14 | 60.00 | A | 30/70 | $LiAsF_6$ | EC/2Me-THF | 49.80 | 1.0 E-3 |
| 48 | 0.15 | 50.00 | A | 0.14 | 60.00 | A | 50/50 | $LiClO_4$ | γ-BL/DME | 58.20 | 1.2 E-3 |
| 49 | 0.05 | 70.00 | | 0.14 | 60.00 | A | 30/70 | $LiClO_4$ | γ-BL | 60.00 | 1.2 E-3 |
| 50 | 0.05 | 70.00 | | 0.14 | 60.00 | A | 30/70 | $LiAsF_6$ | EC/2Me-THF | 61.00 | 2.3 E-3 |
| 51 | 0.05 | 70.00 | | 0.14 | 60.00 | A | 50/50 | $LiClO_4$ | γ-BL/DME | 53.00 | 8.9 E-4 |
| 52 | 0.05 | 70.00 | | 0.19 | 60.00 | | 30/70 | $LiClO_4$ | γ-BL | 49.00 | 1.1 E-3 |
| 53 | 0.05 | 70.00 | | 0.19 | 60.00 | | 30/70 | $LiAsF_6$ | EC/2Me-THF | 51.90 | 1.2 E-3 |
| 54 | 0.05 | 70.00 | | 0.19 | 60.00 | | 50/50 | $LiClO_4$ | γ-BL/DME | 49.80 | 2.1 E-3 |
| 55 | 0.10 | 50.00 | B | 0.14 | 60.00 | A | 30/70 | $LiClO_4$ | γ-BL | 58.20 | 1.4 E-3 |
| 56 | 0.10 | 50.00 | B | 0.14 | 60.00 | A | 30/70 | $LiAsF_6$ | EC/2Me-THF | 57.00 | 1.2 E-3 |
| 57 | 0.10 | 50.00 | B | 0.14 | 60.00 | A | 50/50 | $LiClO_4$ | γ-BL/DME | 61.00 | 2.1 E-3 |

TABLE 3

| Experiment No. | LPP particle Particle size (μm) | LPP particle Butadiene (wt %) | LPP particle Modifier | HPP particle Particle Size (μm) | HPP particle Butadiene (wt %) | HPP particle Modifier | LPP/HPP weight ratio | Electrolyte solution Electrolyte | Electrolyte solution Solvent | Impregration content (wt %) | Ionic conductivity (S/cm) |
|---|---|---|---|---|---|---|---|---|---|---|---|
| 58 | 0.15 | 50.0 | A | 0.14 | 60.00 | A | 30/70 | LiPF$_6$ | γ-BL | 51.90 | 1.4 E-3 |
| 59 | 0.15 | 50.00 | A | 0.14 | 60.00 | A | 30/70 | LiBF$_4$ | γ-BL | 49.80 | 1.1 E-3 |
| 60 | 0.15 | 50.00 | A | 0.14 | 60.00 | A | 30/70 | LiCF$_3$SO$_4$ | γ-BL | 59.20 | 1.6 E-3 |
| 61 | 0.15 | 50.00 | A | 0.14 | 60.00 | A | 30/70 | LiClO$_4$ | γ-BL/DME | 62.30 | 2.3 E-3 |
| 62 | 0.15 | 50.00 | A | 0.14 | 60.00 | A | 30/70 | LiClO$_4$ | PC | 43.00 | 4.3 E-4 |
| 63 | 0.15 | 50.00 | A | 0.14 | 60.00 | A | 30/70 | LiClO$_4$ | PC/DME | 59.00 | 1.9 E-3 |
| 64 | 0.15 | 50.00 | A | 0.14 | 60.00 | A | 30/70 | LiAsF$_6$ | PC/EC | 44.60 | 2.9 E-4 |
| 65 | 0.15 | 50.00 | A | 0.14 | 60.00 | A | 30/70 | LiAsF$_6$ | EC/2Me-THF | 64.30 | 2.1 E-3 |
| 66 | 0.15 | 50.00 | A | 0.14 | 60.00 | A | 50/50 | LiClO$_4$ | γ-BL | 49.00 | 6.9 E-4 |
| 67 | 0.15 | 50.00 | A | 0.14 | 60.00 | A | 50/50 | LiPF$_6$ | γ-BL | 48.00 | 5.9 E-4 |
| 68 | 0.15 | 50.00 | A | 0.14 | 60.00 | A | 50/50 | LiBF$_4$ | γ-BL | 49.00 | 8.8 E-4 |
| 69 | 0.15 | 50.00 | A | 0.14 | 60.00 | A | 50/50 | LiCF$_3$SO$_3$ | γ-BL | 47.30 | 6.9 E-4 |
| 70 | 0.15 | 50.00 | A | 0.14 | 60.00 | A | 50/50 | LiClO$_4$ | γ-BL/DME | 58.00 | 1.8 E-3 |
| 71 | 0.15 | 50.00 | A | 0.14 | 60.00 | A | 50/50 | LiClO$_4$ | PC/DME | 59.30 | 1.7 E-3 |
| 72 | 0.15 | 50.00 | A | 0.14 | 60.00 | A | 50/50 | LiAsF$_6$ | EC/2Me-THF | 60.60 | 2.0 E-3 |
| 73 | 0.15 | 50.00 | A | 0.14 | 60.00 | A | 70/30 | LiClO$_4$ | γ-BL/DME | 53.20 | 8.9 E-4 |
| 74 | 0.15 | 50.00 | A | 0.14 | 60.00 | A | 70/30 | LiAsF$_6$ | EC/2Me-THF | 50.00 | 8.9 E-4 |
| 75 | 0.15 | 50.00 | A | 0.19 | 60.00 |   | 30/70 | LiClO$_4$ | γ-BL | 58.00 | 1.2 E-3 |
| 76 | 0.15 | 50.00 | A | 0.19 | 60.00 |   | 30/70 | LiAsF$_6$ | EC/2Me-THF | 60.10 | 1.0 E-3 |
| 77 | 0.15 | 50.00 | A | 0.19 | 60.00 |   | 50/50 | LiClO$_4$ | γ-BL/DME | 61.90 | 1.9 E-3 |
| 78 | 0.05 | 70.00 |   | 0.14 | 60.00 | A | 30/70 | LiClO$_4$ | γ-BL | 58.00 | 2.0 E-3 |
| 79 | 0.05 | 70.00 |   | 0.14 | 60.00 | A | 30/70 | LiAsF$_6$ | EC/2Me-THF | 55.50 | 1.8 E-3 |
| 80 | 0.05 | 70.00 |   | 0.14 | 60.00 | A | 50/50 | LiClO$_4$ | γ-BL/DME | 56.60 | 1.0 E-3 |
| 81 | 0.05 | 70.00 |   | 0.19 | 60.00 |   | 30/70 | LiClO$_4$ | γ-BL | 59.00 | 9.6 E-4 |
| 82 | 0.05 | 70.00 |   | 0.19 | 60.00 |   | 30/70 | LiAsF$_6$ | EC/2Me-THF | 60.20 | 1.9 E-3 |
| 83 | 0.05 | 70.00 |   | 0.19 | 60.00 |   | 50/50 | LiClO$_4$ | γ-BL/DME | 58.00 | 1.6 E-3 |
| 84 | 0.10 | 50.00 | B | 0.14 | 60.00 | A | 30/70 | LiClO$_4$ | γ-BL | 58.60 | 1.2 E-3 |
| 85 | 0.10 | 50.00 | B | 0.14 | 60.00 | A | 30/70 | LiAsF$_6$ | EC/2Me-THF | 63.20 | 2.1 E-3 |
| 86 | 0.10 | 50.00 | B | 0.14 | 60.00 | A | 50/50 | LiClO$_4$ | γ-BL/DME | 56.90 | 9.8 E-4 |

TABLE 4

| Experiment No. | LPP particle Particle size (μm) | LPP particle Butadiene (wt %) | LPP particle Modifier | HPP particle Particle Size (μm) | HPP particle Butadiene (wt %) | HPP particle Modifier | LPP/HPP weight ratio | Electrolyte solution Electrolyte | Electrolyte solution Solvent | Impregration content (wt %) | Ionic conductivity (S/cm) |
|---|---|---|---|---|---|---|---|---|---|---|---|
| 87 | 0.15 | 50.0 | A | 0.14 | 60.00 | A | 30/70 | LClO$_4$ | γ-BL | 55.00 | 1.7 E-3 |
| 88 | 0.15 | 50.00 | A | 0.14 | 60.00 | A | 30/70 | LiBF$_4$ | γ-BL | 56.30 | 1.4 E-3 |
| 89 | 0.15 | 50.00 | A | 0.14 | 60.00 | A | 30/70 | LiCF$_3$SO$_3$ | γ-BL | 58.90 | 1.1 E-3 |
| 90 | 0.15 | 50.00 | A | 0.14 | 60.00 | A | 30/70 | LiClO$_4$ | γ-BL/DME | 60.10 | 2.1 E-3 |
| 91 | 0.15 | 50.00 | A | 0.14 | 60.00 | A | 30/70 | LiClO$_4$ | PC | 45.00 | 7.1 E-4 |
| 92 | 0.15 | 50.00 | A | 0.14 | 60.00 | A | 30/70 | LiClO$_4$ | PC/DME | 60.00 | 1.9 E-3 |
| 93 | 0.15 | 50.00 | A | 0.14 | 60.00 | A | 30/70 | LiAsF$_6$ | PC/EC | 48.00 | 8.8 E-4 |
| 94 | 0.15 | 50.00 | A | 0.14 | 60.00 | A | 30/70 | LiAsF$_6$ | EC/2Me-THF | 60.00 | 2.2 E-3 |
| 95 | 0.15 | 50.00 | A | 0.14 | 60.00 | A | 50/50 | LiClO$_4$ | γ-BL | 49.00 | 9.0 E-4 |
| 96 | 0.15 | 50.00 | A | 0.14 | 60.00 | A | 50/50 | LiFB$_4$ | γ-BL | 50.20 | 6.8 E-4 |
| 97 | 0.15 | 50.00 | A | 0.14 | 60.00 | A | 50/50 | LiCF$_3$SO$_3$ | γ-BL | 51.30 | 7.1 E-4 |
| 98 | 0.15 | 50.00 | A | 0.14 | 60.00 | A | 50/50 | LiClO$_4$ | γ-BL/DME | 55.20 | 1.5 E-3 |
| 99 | 0.15 | 50.00 | A | 0.14 | 60.00 | A | 50/50 | LiClO$_4$ | PC/DME | 57.30 | 1.2 E-3 |
| 100 | 0.15 | 50.00 | A | 0.14 | 60.00 | A | 50/50 | LiAsF$_6$ | EC/2Me-THF | 56.90 | 1.1 E-3 |
| 101 | 0.15 | 50.00 | A | 0.14 | 60.00 | A | 70/30 | LiClO$_4$ | γ-BL/DME | 60.00 | 2.1 E-3 |
| 102 | 0.15 | 50.00 | A | 0.14 | 60.00 | A | 70/30 | LiAsF$_6$ | EC/2Me-THF | 62.40 | 2.6 E-3 |
| 103 | 0.15 | 50.00 | A | 0.19 | 60.00 |   | 30/70 | LiClO$_4$ | γ-BL | 52.00 | 8.6 E-4 |
| 104 | 0.15 | 50.00 | A | 0.19 | 60.00 |   | 30/70 | LiAsF$_6$ | EC/2Me-THF | 57.60 | 1.4 E-3 |
| 105 | 0.15 | 50.00 | A | 0.19 | 60.00 |   | 50/50 | LiClO$_4$ | γ-BL/DME | 53.90 | 9.4 E-4 |
| 106 | 0.05 | 70.00 |   | 0.14 | 60.00 | A | 30/70 | LiClO$_4$ | γ-BL | 55.30 | 1.2 E-3 |
| 107 | 0.05 | 70.00 |   | 0.14 | 60.00 | A | 30/70 | LiAsF$_6$ | EC/2Me-THF | 56.90 | 1.1 E-3 |
| 108 | 0.05 | 70.00 |   | 0.14 | 60.00 | A | 50/50 | LiClO$_4$ | γ-BL/DME | 60.00 | 2.1 E-3 |
| 109 | 0.05 | 70.00 |   | 0.19 | 60.00 |   | 30/70 | LiClO$_4$ | γ-BL | 54.30 | 8.6 E-4 |
| 110 | 0.05 | 70.00 |   | 0.19 | 60.00 |   | 30/70 | LiAsF$_6$ | EC/2Me-THF | 58.00 | 1.9 E-3 |
| 111 | 0.05 | 70.00 |   | 0.19 | 60.00 |   | 50/50 | LiClO$_4$ | γ-BL/DME | 57.00 | 1.1 E-3 |
| 112 | 0.10 | 50.00 | B | 0.14 | 60.00 | A | 30/70 | LiClO$_4$ | γ-BL | 55.00 | 9.5 E-4 |
| 113 | 0.10 | 50.00 | B | 0.14 | 60.00 | A | 30/70 | LiAsF$_6$ | EC/2Me-THF | 56.90 | 9.3 E-4 |
| 114 | 0.10 | 50.00 | B | 0.14 | 60.00 | A | 50/50 | LiClO$_4$ | γ-BL/DME | 59.10 | 1.1 E-3 |

TABLE 5

| Experiment No. | LPP component Butadiene (wt %) | LPP component Modifier | HPP component Butadiene (wt %) | HPP component Modifier | LPP/HPP weight ratio | Electrolyte solution Electrolyte | Electrolyte solution Solvent | Electrolyte solution Impregnation content (wt %) | Ionic conductivity (S/cm) |
|---|---|---|---|---|---|---|---|---|---|
| 115 | 75.00 | | 49.00 | | 30/70 | $LiClO_4$ | γ-BL | 47.20 | 6.9 E-4 |
| 116 | 75.00 | | 49.00 | | 30/70 | $LiAsF_6$ | EC/2Me-THF | 52.10 | 1.5 E-3 |
| 117 | 75.00 | | 49.00 | | 50/50 | $LiClO_4$ | γ-BL | 44.60 | 4.3 E-4 |
| 118 | 75.00 | | 49.00 | | 50/50 | $LiAsF_6$ | EC/2Me-THF | 50.00 | 1.0 E-3 |
| 119 | 75.00 | | 49.00 | | 70/30 | $LiAsF_6$ | EC/2Me-THF | 46.90 | 8.8 E-4 |
| 120 | 75.00 | | 60.00 | | 30/70 | $LiClO_4$ | γ-BL | 45.60 | 3.8 E-4 |
| 121 | 75.00 | | 60.00 | | 30/70 | $LiAsF_6$ | EC-2Me-THF | 46.10 | 6.9 E-4 |
| 122 | 75.00 | | 60.00 | | 50/50 | $LiClO_4$ | γ-BL | 43.90 | 2.2 E-4 |
| 123 | 75.00 | | 60.00 | | 50/50 | $LiClO_4$ | γ-BL | 43.90 | 2.2 E-4 |
| 124 | 75.00 | | 73.00 | A | 30/70 | $LiClO_4$ | γ-BL | 50.90 | 8.9 E-4 |
| 125 | 76.50 | B | 60.00 | | 30/70 | $LiClO_4$ | γ-BL | 53.80 | 1.3 E-3 |

TABLE 6

| Experiment No. | LPP component Butadiene (wt %) | LPP component Modifier | HPP component Butadiene (wt %) | HPP component Modifier | LPP/HPP weight ratio | Electrolyte solution Electrolyte | Electrolyte solution Solvent | Electrolyte solution Impregnation content (wt %) | Ionic conductivity (S/cm) |
|---|---|---|---|---|---|---|---|---|---|
| 126 | 75.00 | | 49.00 | | 30/70 | $LiClO_4$ | γ-BL | 48.90 | 8.9 E-4 |
| 127 | 75.00 | | 49.00 | | 30/70 | $LiAsF_6$ | EC/2Me-THF | 53.90 | 1.7 E-3 |
| 128 | 75.00 | | 49.00 | | 50/50 | $LiClO_4$ | γ-BL | 45.60 | 6.3 E-4 |
| 129 | 75.00 | | 49.00 | | 50/50 | $LiAsF_6$ | EC/2Me-THF | 50.20 | 1.7 E-3 |
| 130 | 75.00 | | 49.00 | | 70/30 | $LiAsF_6$ | EC/2Me-THF | 48.60 | 1.0 E-4 |
| 131 | 75.00 | | 60.00 | | 30/70 | $LiClO_4$ | γ-BL | 45.60 | 3.8 E-4 |
| 132 | 75.00 | | 60.00 | | 30/70 | $LiAsF_6$ | EC/2Me-THF | 48.90 | 7.9 E-4 |
| 133 | 75.00 | | 60.00 | | 50/50 | $LiClO_4$ | γ-BL | 46.90 | 2.8 E-4 |
| 134 | 75.00 | | 60.00 | | 50/50 | $LiAsF_6$ | EC/2Me-THF | 50.10 | 1.1 E-3 |
| 135 | 75.00 | | 73.00 | A | 30/70 | $LiClO_4$ | γ-BL | 50.90 | 8.9 E-4 |
| 136 | 76.50 | B | 60.00 | | 30.70 | $LiClO_4$ | γ-BL | 55.90 | 1.5 E-3 |

What is claimed is:

1. A solid polymer electrolyte of a multiphase microstructure comprising a polymer matrix and a highly polar electrolyte solution disposed in said polymer matrix, wherein said multiphase microstructure comprises a high polar phase having a highly polar solid polymeric component and a less polar phase having a less polar solid polymeric component than said highly polar polymeric component selected from the group consisting of polystyrene, polypropylene, polyisobutene, polyethylene, polybutadiene, polyisoprene, poly-chloroprene, poly(α-methylstyrene), a polybutylmethary-late, polybutylacrylate, poly(2-ethylhexylacrylate), polydibutylphthalate, polyvinylbutylether, polyvinyl butyral, polyvinyl formal, and copolymers of said polymeric components, wherein said highly polar phase is impregnated with said highly polar electrolyte solution to form ion conductive channels, and wherein said less polar phase forms a support phase which is composed of particle agglomerates and retains its particles shape appearances in the presence of said highly polar electrolyte.

2. A solid polymer electrolyte of a multiphase microstructure comprising a polymer matrix and a highly polar electrolyte solution disposed in said polymer matrix wherein said multiphase microstructure comprises a high polar phase having a highly polar solid polymer component selected from the group consisting of at least one of polyacrylonitrile, polyvinylidene fluoride, polyethylene oxide, polypropylene oxide, polyvinyl chloride, polymethylmethacrylate, polymethylacrylate, polymethacrylic acid (and their metallic salts), polyacrylic acid (and their metallic salts), polyvinylalcohol, polyvinylidene chloride, polyethylenimine, polymethacry-lonitrile, polyvinylacetate, polyvinylpyrrolidone, their derivatives thereof, and copolymers selected from the group consisting of polyacrylonitrile with polybutadiene, polyacrylonitrile with polystyrene, polyacrylonitrile with polybutadiene and polystyrene, and polyacrylonitrile with polyisoprene, and a less polar phase having a less polar solid polymeric component than said highly polar polymeric component selected from the group consisting of polystyrene, polypropylene, polyisobutene, polyethylene, polybutadiene, polyisoprene, polychloroprene, poly(α-methylstyrene), a polybutylmethacrylate, polybutylacrylate, poly(2-ethylhexylacrylate), polydibutylphthalate, polyvinylbutylether, polyvinyl butyral, polyvinyl formal, and copolymers of said polymeric components, wherein said highly polar phase is impregnated with said highly polar electrolyte solution to form ion conductive channels, and wherein said less polar phase forms a support phase which is composed of particle agglomerates and retains its particles shape appearances in the presence of said highly polar electrolyte solution.

3. A solid polymer electrolyte as claimed in claim 2, wherein a starting feed material for said highly polar polymeric component is supplied in a non-particulate form or in a particulate form, and includes a polyacrylonitrile material.

4. A solid polymer electrolyte as claimed in claim 2, wherein at least one of said highly polar polymeric particles and said less polar polymeric component includes a rubber material.

5. A solid polymer electrolyte as claimed in one of claims 3 and 4, wherein said highly polar polymeric component comprises poly(acrylonitrile-butadiene) materials and a less polar polymeric component comprises poly(styrene-butadiene) materials.

6. A solid polymer electrolyte as claimed in claim 2, wherein at least one of said highly polar polymeric component and said less polar polymeric component includes at least one of a polar organic material and a cross-linking material.

7. A solid polymer electrolyte as claimed in claim 6 wherein said organic polar material includes a carboxyl group material or a carboxylate metal salt substituent material.

8. A solid polymer electrolyte as claimed in claim 2, wherein said electrolyte solution is present at least in part in said less polar polymeric phase.

9. A solid polymer electrolyte as claimed in claim 2 or 13, wherein said electrolyte solution is a metal salt solution.

10. A solid polymer electrolyte as claimed in claim 9 wherein said metal salt solution is a lithium salt solution.

* * * * *

UNITED STATES PATENT AND TRADEMARK OFFICE
CERTIFICATE OF CORRECTION

PATENT NO.   :  5,585,039
DATED        :  December 17, 1996
INVENTOR(S)  :  Morihiko MATSUMOTO et al.

It is certified that error appears in the above-indentified patent and that said Letters Patent is hereby corrected as shown below:

Claim 1, column 23, line 54, "particles shape appearances" should read --particle shape appearance--.

Claim 2, column 24, lines 52-53, "particles shape appearances" should read --particle shape appearance--.

Claim 9, column 26, line 4, "claim 2 or 13" should read --claim 2 or 8--.

Signed and Sealed this

Twelfth Day of August, 1997

*Attest:*

BRUCE LEHMAN

*Attesting Officer*     Commissioner of Patents and Trademarks